Dec. 21, 1954  J. P. BRICKER  2,697,574
FOLDING STAND FOR SUPPORTING FOOD PLATES OR TRAYS
Filed July 15, 1950  2 Sheets-Sheet 1

INVENTOR.
John Paul Bricker
BY
Arnold and Mathis
ATTORNEYS

Dec. 21, 1954    J. P. BRICKER    2,697,574
FOLDING STAND FOR SUPPORTING FOOD PLATES OR TRAYS
Filed July 15, 1950    2 Sheets-Sheet 2
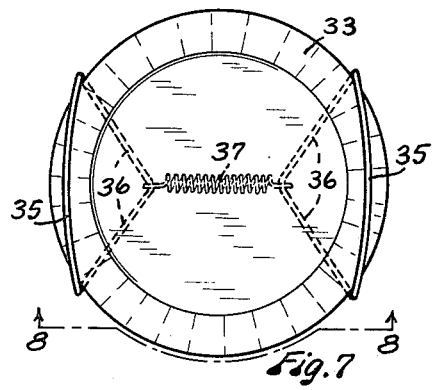
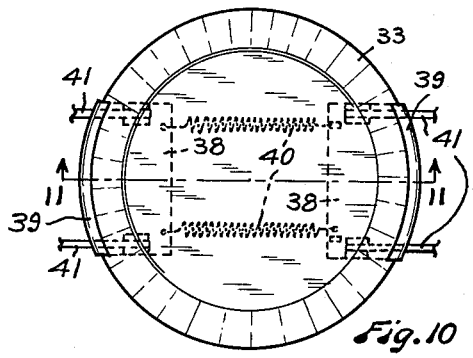
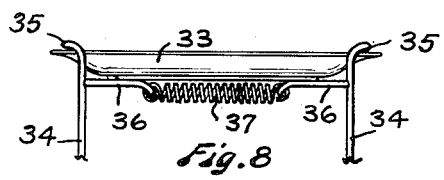
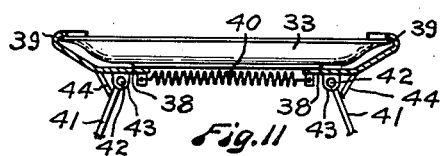
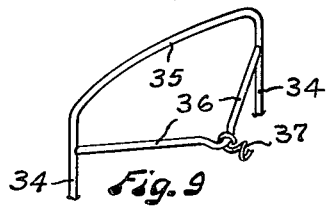
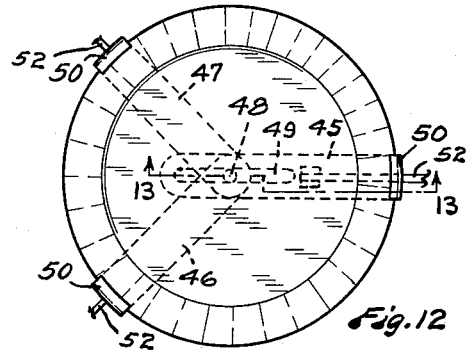
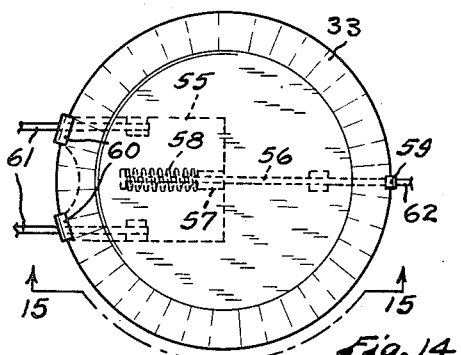
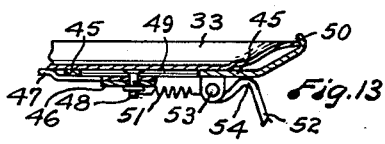
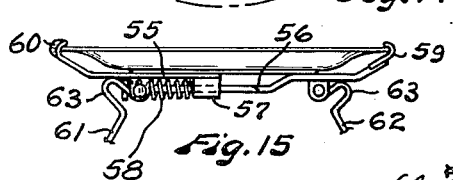
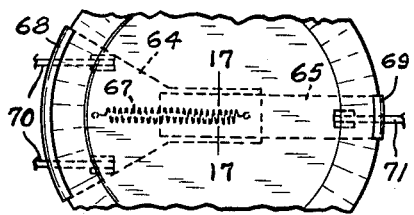
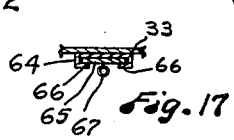
INVENTOR.
John Paul Bricker
BY
Arnold and Mathis
ATTORNEYS

United States Patent Office 2,697,574
Patented Dec. 21, 1954

2,697,574
FOLDING STAND FOR SUPPORTING FOOD PLATES OR TRAYS

John Paul Bricker, Seattle, Wash.

Application July 15, 1950, Serial No. 174,007

5 Claims. (Cl. 248—149)

My invention relates to a folding stand for supporting a food plate or tray.

More particularly, my invention relates to a plate or tray stand which may be quickly and easily set up for use, quickly folded for storing or transporting purposes, and of economical manufacture.

The inconvenience of holding a plate or tray (these terms are used herein interchangeably) on one's lap at a buffet dinner is well known and to maintain the same horizontally to keep the coffee or tea from spilling is indeed difficult. Serving at tables a large number of people, as at receptions, generally requires the parties to eat in relays and under the pressure of hurrying due to the realization that others are waiting. The room required for tables limits their number and interrupts the customary circle of chairs about the room or alcove. Accordingly, there is a real need for a small plate holding device of the character herein described. The essential features of such a device, in general, comprise the following: It must securely hold the plate or tray. It must be capable of being quickly set up for individual service at one's chair. It must be formed of members which may be folded and caused to lie in telescoping relation for storing and for transportation. Its members are preferably bound together in a manner which will keep the members of the stand in pairs while being stored and transported. After a plate has been inserted in the stand of my invention, the stand and plate preferably should be capable of being lifted by the plate as one unit, and moved from one location to another—thus, the plate may be supplied with food, inserted in the stand and the whole unit carried with one hand to the point of use.

The device of my invention furthermore is especially useful at picnics, barbecues, or while camping, or the like, where the end portions of the leg members of the stand may be pressed into the ground. Furthermore, the device of my invention is well adapted to support flower containers, especially for temporary decorations. The above are illustrative of the various possible uses of the device embodying my invention.

Another object is to provide a folding plate stand of the above character which is adjustable to plates or trays of different sizes and one which will support a plate or tray firmly at a convenient height for the use of a person who may be sitting in a chair or on the ground.

Also, another object of my invention is to provide such a device which may be economically constructed and manufactured.

The primary object of my invention, therefore, is to provide a stand for holding a plate which meets all of the above requirements.

The above mentioned general objects of my invention, together with others inherent in the same, are attained by the mechanism illustrated in the following drawings, throughout which like reference numerals indicate like parts:

Fig. 7 is a top plan view of a modified form of this invention as it may appear when a plate is being supported thereby, parts being shown by dotted lines;

Fig. 8 is a fragmentary side view looking in the direction of broken line 8—8 of Fig. 7;

Fig. 9 is a detached fragmentary perspective view of the upper end portion of one of the plate holding members shown in Figs. 7 and 8;

Fig. 10 is a top plan view of another modified form of this invention as it may appear when a plate is being supported thereby, parts being shown by dotted lines;

Fig. 11 is a fragmentary sectional view looking in the direction indicated by broken line 11—11 of Fig. 10;

Fig. 12 is a top plan view, with parts shown by dotted lines, of another modified form of plate stand as it may appear when a plate is held therein;

Fig. 13 is a fragmentary sectional view taken substantially on broken line 13—13 of Fig. 12;

Fig. 14 is a top plan view, with parts shown by dotted lines, of another modified form of plate stand as it may appear when a plate is held therein;

Fig. 15 is a fragmentary view in side elevation looking in the direction indicated by broken line 15—15 of Fig. 14;

Fig. 16 is a fragmentary plan view, with parts shown by dotted lines, of still another modified form of plate stand as it may appear when a plate is held therein; and Fig. 17 is a fragmentary cross sectional view taken substantially on broken line 17—17 of Fig. 16.

Figure 1:
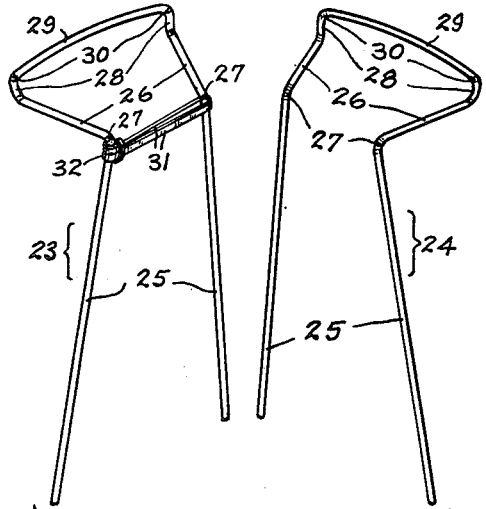
Figure 1 is an exploded perspective view showing the two parts of this plate stand in separated or disconnected relation.

The plate stand shown in Figs. 1 to 6 inclusive comprises two upright members or parts or unit 23 and 24, of duplicate construction each formed of a single piece of preferably round metal rod or heavy wire which may be of about three-sixteenths inch diameter. Metal tubing could also be used and also such tubing with telescoping rods for varying length as commonly done.

Each one piece upright member or stand part 23 and 24 comprises two straight divergent leg members 25, two divergent plate supporting members 26 positioned approximately at right angles to the leg members 25 and connected with the leg members 25 by two sharply bent portions or knees 27, two upwardly curved portions 28, and a plate retaining or gripping cross bar 29 connected with the curved portions 28 by two abruptly bent portions 30.

The two one piece stand parts or members are adapted to be adjustably connected with each other by elastic means in such a manner that they can be folded into compact form for packaging and transporting and can be spread apart or opened up or unfolded quickly and easily when they are to be used to support a plate.

A preferred way of connecting these two stand parts together is to use an endless band 31 of elastic material, such as rubber. This band 31 is looped or snubbed or otherwise fastened to one of the leg members 25 of one part, such as 23, near the bend 27 thereof by a looped portion 32 and said band is slipped over the other leg member 25 so that it assumes a position substantially as shown at the left in Fig. 1. The elastic band 31 is of a suitable length so that it will be placed under some tension when it is thus applied to a stand member. The other stand member or part 24, such as the one shown at the right in Fig. 1, is connected with the stand member to which the band is attached by passing the leg members thereof downwardly through the band 31, as shown in folded form Fig. 5. The bend at 27 serves the function of keeping the band 31 in place on the member 24 to which it is not fastened, as at 32, to member 23. In place of band 31 being of the preferable elastic character it could be non-elastic and adjustable.

After the two stand members have been connected together by the elastic band 31, as above described, said band 31, will yieldingly hold them together and will permit said two stand members to be relatively oriented on their vertical axes between a folded position and an operative or plate supporting position. In the folded position, see Fig. 5, the horizontal or overhanging portions 26, 28, 29 of the two stand members will extend in the same direction and will be in telescoping or approximate registration relation and the legs 25 will lie close together to provide maximum compactness.

Figure 2:
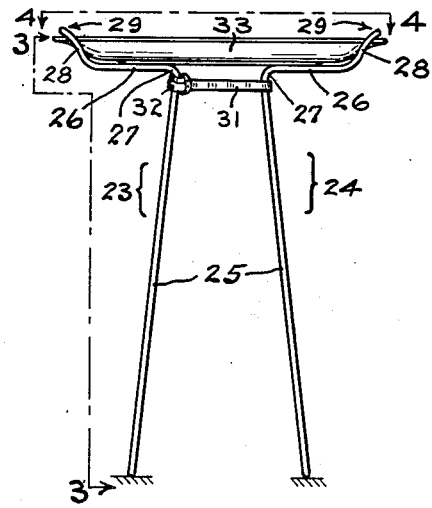
Fig. 2 is a side view of this plate stand showing the parts thereof connected and a plate supported thereby.
Figure 3:
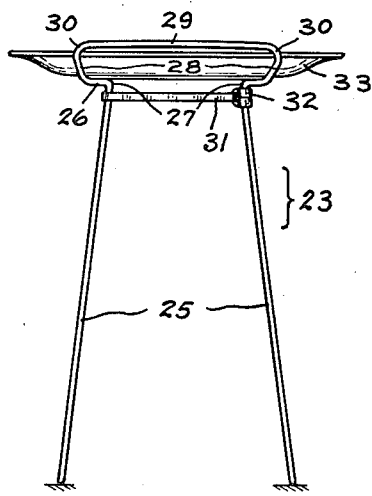
Fig. 3 is another side view of this plate stand taken at right angles to Fig. 2 and looking in the direction of broken line 3—3 of Fig. 2.
Figure 4:
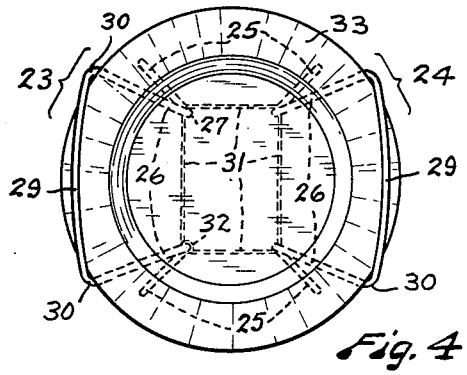
Fig. 4 is a plan view looking down, as indicated by broken line 4—4 of Fig. 2.
Figure 5:
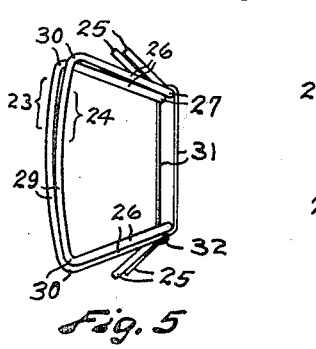
Fig. 5 is a top end view of this plate stand as it may appear when folded.
Figure 6:
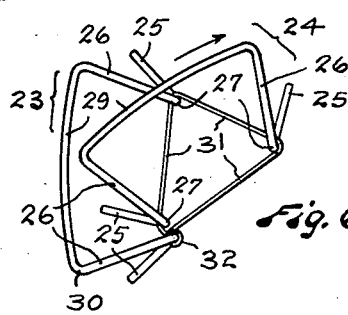
Fig. 6 is a top plan view of this plate stand showing the two parts in a relative position through which they may pass when they are being moved between a folded position and an operative or plate holding position.

The manner of setting up the stand will now be described. Assuming that the members of the stand are in folded position, as shown in Fig. 5, the upper member or unit 24 is turned or oriented through 180° as shown in Fig. 6, within connector 31 of band form so that the parts of said upper member are oppositely disposed to the parts of member 23 (see Fig. 2). In Fig. 6 the member 24 is shown being turned clockwise until it has been turned completely to the position occupied as shown in Figs. 2 and 4 with the plate 33 in gripped position between said members or units 23 and 24. In doing this the elastic member 31 will be stretched and will slide over the leg parts 25 of the member 24 while the part 24 is being turned or oriented within the elastic band member 31.

When the two stand members are in a relatively unfolded position a plate 33 may be quickly and easily engaged therewith by moving the two stand members apart and placing the plate 32 on the plate supporting portions 26 thereof with opposite edge portions of the plate 33 under the plate retaining cross bars 29. The elastic member 31 yields to allow the two plate stand members to be moved apart and yieldingly draws the plate stand members into engagement with the plate as soon as the force tending to separate said plate stand members is relaxed.

The contractile force of the resilient band 31 draws the two plate stand members together on the plate 33 and securely grips said plate. The lower end portions of the legs 25 may rest on a level surface or they may be pressed into the ground to provide greater stability and minimize the danger of tipping over.

The plate stand is adapted by reason of the elastic member 31 and the form of the members or parts 23 and 24 to receive and support plates or trays of various different sizes. The elastic member 31 also serves to maintain the parts or members 23 and 24 connected together while being stored, as well as while being transported. This avoids waste of time in assembling.

Figs. 7 and 8 and 9 show a modification of this invention comprising two duplicate plate stand members of inverted U shape each composed of two spaced apart substantially parallel leg members 34, a plate engaging integral top cross bar 35 and a rigidly attached V-shaped plate supporting member 36. The member 36 is positioned substantially at right angles to the plane of the U-shaped member to which it is attached and may be welded to the legs 34.

An elastic tension member, shown to be a helical tension spring 37 connects the two V-shaped plate supporting members illustrated in Figs. 7, 8 and 9. Obviously, a rubber strap or band may be substituted for the helical tension spring 37. The plate stand shown in Figs. 7, 8 and 9 is applied to a plate 33 and grips and holds the plate in substantially the same manner as the previously described plate stand of Figs. 1 to 6 inclusive.

The spring 37 loosely connects the two plate stand members of Figs. 7, 8 and 9 together so that these two plate stand members can be compactly folded when they are not being used to hold a plate.

Figs. 10 and 11 show another modified form of this invention comprising two duplicate plate stand members each consisting of a generally rectangular piece of metal 38 having a hook shaped outer edge portion 39 adapted to hook over the marginal portion of a plate 33. The plate 33 rests on the flat part of the metal pieces 38. Preferably two elastic tension members, which may be springs 40 or may be bands or strips of rubber, connect the two metal pieces 38 to hold them in engagement with the plate 33.

Preferably two legs 41 are pivotally connected by pivots 42 with lugs 43 on the metal pieces 38 and extend downwardly and outwardly from said metal pieces 38 when a plate 33 is being supported. Stop members 44 are provided to limit outward swinging movement of the legs 41.

The plate stand shown in Figs. 10 and 11 is applied to a plate 33 and grips and holds the plate in a manner similar to the previously described plate stands. The plate supporting pieces 38 can be folded parallel to the legs 41 and the stand collapsed so that it will be relatively flat when not in use.

Figs. 12 and 13 show another modified form of plate stand comprising three flat bars 45, 46 and 47 which are connected with each other by a pivot member 48. The bar 45 is provided with a slot 49 which slides on the pivot member 48. Each bar 45, 46 and 47 has a hook like portion 50 in its outer end to hook over the edge portion of a plate 43. An elastic tension member, such as a spring 51 is connected between the slotted bar 45 and the other two bars 46 and 47 to yieldingly hold the hook shaped outer end portions 50 of said bars in engagement with a plate 33. A leg member 52 is connected by a pivot member 53 with each bar 45, 46 and 47. Each leg member 52 is bent near the pivoted end portion thereof to provide a stop portion 54 which is adapted to engage with the bar 45, 46 or 47 with which the leg member is connected to limit outward swinging movement of the leg member. When the legs 42 are in an operative position they extend downwardly and outwardly and provide a three point support which will rest evenly and without tilting on any supporting surface on which they are placed.

The plate stand shown in Figs. 12 and 13 operates similarly to those previously described in supporting a plate and can be folded by positioning the bars 45, 46 and 47 alongside of each other and folding the legs 52 inwardly.

Figs. 14 and 15 show another modified form of this invention comprising a piece of flat metal 55 forming one plate support and a metal bar 56 forming another plate support. The bar 56 is slidably disposed within a boss 57 which is secured to the flat metal piece 55. A compression spring 58 on the bar 56 is adapted to urge a hook shaped portion 59 on the bar 56 and other hook shaped portions 60 on the flat metal piece 55 into engagement with the marginal portion of a plate 33. Preferably two legs 61 are pivotally connected with the flat metal piece 55 and one leg 62 is pivotally connected with the bar 56. The legs 61 and 62 have stops 63 formed therein which limit their outward swinging movement. The slidably connected plate supports 55 and 56 are easily pulled apart to receive a plate and the legs on these parts are foldable alongside of these parts into a compact position.

Figs. 16 and 17 show another modified form of this invention comprising two flat metal plate supports 64 and 65 which are telescopically connected with each other, as by providing on a portion of the plate support 64, see Fig. 17, inwardly bent edge portions 66 forming grooves to slidably receive the plate support 65. A spring 67 urges members 64 and 65 toward each other and holds hook shaped portions 68 and 69 of these respective members into engagement with a plate 33. Preferably two legs 70 are pivotally connected with the member 64 and one leg 71 is pivotally connected with the member 65. These legs 70 and 71 are similar to legs 61 and 62 of Figs. 14 and 15 and fold in a similar manner.

In all preferred forms of this invention herein disclosed this plate stand comprises two relatively adjustable members urged toward each other by elastic means and adapted to be moved apart to receive therebetween plates or trays of different sizes, each member having leg means and having plate supporting means whereon a plate may rest and having hook like plate retaining means adapted to hook over and receive and hold the marginal portions of a plate or tray.

Obviously, changes may be made in the forms, dimensions, and arrangement of the parts of my invention, without departing from the principle thereof, the above setting forth only preferred forms of embodiment.

I claim:

1. A plate stand for plates of varying size comprising two substantially similar and separate corresponding members as to size of parts and shape, said correspondence of structure permitting folding and nesting with respect to each other when demounted, each of said members having a plate supporting bar with knees and plate gripping means which means is adapted to extend over and across spaced edge portions of the plate to be held, and lower end portions extending from said knees as legs for the stand, and an elastic connector of band form mounted about said knees encircling and resiliently connecting the legs of said two members at said knees in holding said members in oppositely disposed position when the gripping portion of each is supporting a plate therebetween, said elastic member being of such elasticity as to permit (a) the turning of one member through an angle of 180° within said elastic member when the plate is removed, (b) superimposing the turned member upon the other member in nesting position, and (c) binding the two members together while nesting.

2. A portable demountable variable sized plate holding device comprising two similar members oppositely disposed and adapted to hold resiliently a plate to be supported when in assembled set-up-position, each member comprising a plate gripping portion adapted to extend over and across the top and laterally of spaced apart edges of the plate to be held, a plate bottom supporting portion, legs, and knees joining said plate supporting portion to said legs, and an elastic band connector mounted around said knees whereby said members may be held in oppositely disposed position when the gripping portion of each is supporting a plate therebetween, said elastic band being of such elasticity as to permit (a) the turning of one member through an angle of 180° within said elastic member when the plate is removed, and (b) superimposing the turned member upon the other member in nesting the same.

3. A plate stand comprising two similar complementary members each having plate-supporting means adapted to extend below a plate when in operative position, leg means extending from one end of said plate-supporting means, and means for gripping a plate against said plate-supporting means including a cross member spaced above the plate-supporting means and adapted to extend across the upper surface of a plate when the stand is in operative position and a pair of members connecting the ends of the cross member to the opposite end of the plate-supporting means; and a connector embracing said leg means of both of said complementary members and holding them together, the operative length of said connector being adjustable to vary the spacing of the leg supporting means in correspondence with the size of the plate being supported on the stand, whereby plates of various sizes may be supported and gripped by the stand, said complementary members being of such similar size and shape that they may be nested together when not in use.

4. A plate stand as defined in claim 3 in which said connector is of elastic material and is of such length as to permit the reversal of one of the complementary members by turning it within the connector in nesting and complementary members.

5. A portable demountable plate stand comprising two similar complementary members each having a cross member adapted to extend across the upper surface of a plate, a pair of plate margin-engaging elements each having one of its ends connected to one end of the cross member and extending obliquely with respect thereto, a pair of plate bottom engaging elements each having one of its ends connected to the opposite end of the respective plate margin-engaging element and a pair of leg elements extending divergingly apart and angularly with respect to said plate bottom engaging elements, one end of each of said leg elements being adapted to rest on a support and the opposite end being connected to the other end of the respective plate bottom engaging element; and a connector of elastic material and embracing the leg elements of both of said complementary members and holding them together, the operative length of said connector being adjustable to vary the spacing of said leg elements in correspondence with the size of the plate being supported by the stand, said complementary members being of such similar size and shape and said connector being of such length that one of the complementary members may be turned within the connector through an angle of 180° to nest the two complementary members together.

References Cited in the file of this patent

UNITED STATES PATENTS

| Number | Name | Date |
| --- | --- | --- |
| 236,845 | Schenrich | Jan. 18, 1881 |
| 358,688 | Nassauer | Mar. 1, 1887 |
| 422,484 | Yarnall | Mar. 4, 1890 |
| 619,362 | Stevenson | Feb. 14, 1899 |
| 826,162 | Hedges et al. | July 17, 1906 |
| 1,349,473 | Rosenthal | Aug. 10, 1920 |
| 1,553,441 | Grunwald | Sept. 15, 1925 |
| 2,415,983 | Yerzley | Feb. 18, 1947 |
| 2,515,793 | Owens | July 18, 1950 |